US011935308B2

(12) United States Patent
Nakamoto et al.

(10) Patent No.: US 11,935,308 B2
(45) Date of Patent: Mar. 19, 2024

(54) OBJECT RECOGNITION APPARATUS, VEHICLE, AND OBJECT RECOGNITION METHOD

(71) Applicant: HONDA MOTOR CO., LTD., Tokyo (JP)

(72) Inventors: Go Nakamoto, Tokyo (JP); Yoshiyuki Kuroba, Wako (JP); Hiroshi Maeda, Wako (JP); Masashi Hagimoto, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 853 days.

(21) Appl. No.: 16/985,651

(22) Filed: Aug. 5, 2020

(65) Prior Publication Data
US 2020/0364475 A1    Nov. 19, 2020

Related U.S. Application Data

(63) Continuation of application No. PCT/JP2018/011840, filed on Mar. 23, 2018.

(51) Int. Cl.
*G06V 20/58* (2022.01)
*G01S 7/41* (2006.01)
(Continued)

(52) U.S. Cl.
CPC .............. *G06V 20/584* (2022.01); *G06T 7/70* (2017.01); *G01S 7/411* (2013.01); *G01S 7/539* (2013.01);
(Continued)

(58) Field of Classification Search
CPC ......... G06V 20/584; B62J 6/022; G06K 9/60; G06K 9/00; E04H 8/42; B60W 30/18163; G07B 15/00; G08G 1/01
See application file for complete search history.

(56) References Cited

U.S. PATENT DOCUMENTS 10,552,688 B2    2/2020  Faber et al.
2018/0229733 A1*  8/2018  Upmanue ....... B60W 30/18163

FOREIGN PATENT DOCUMENTS

CN    102044151 A  *  5/2011  ............... G08G 1/01
CN    103914701 B  * 10/2017  ............... G06K 9/60
(Continued)

OTHER PUBLICATIONS

International Search Report dated Jun. 26, 2018, issued in counterpart International Application No. PCT/JP2018/011840. (1 page).

*Primary Examiner* — Yuri Kan
(74) *Attorney, Agent, or Firm* — WHDA, LLP

(57) ABSTRACT

An object recognition apparatus mounted in a vehicle including a sensor is provided. The apparatus includes a detection unit configured to detect an object present in a same lane as that of the vehicle by using information from the sensor, an acquisition unit configured to acquire information concerning lights which the object turns on by using the information from the sensor, and a determining unit configured to determine a type of the object based on the information concerning the lights. A condition in which the determination unit determines that the type of the object is a two-wheeled vehicle includes a case in which the object includes not less than two lights arrayed in a vertical direction with respect to the ground surface.

9 Claims, 5 Drawing Sheets

(51) Int. Cl.
*G01S 7/539* (2006.01)
*G01S 13/931* (2020.01)
*G01S 15/931* (2020.01)
*G05D 1/00* (2006.01)
*G06T 7/70* (2017.01)

(52) U.S. Cl.
CPC ........... *G01S 13/931* (2013.01); *G01S 15/931* (2013.01); *G05D 1/0231* (2013.01); *G05D 1/0255* (2013.01); *G05D 1/0257* (2013.01); *G06T 2207/30252* (2013.01)

(56) References Cited

FOREIGN PATENT DOCUMENTS

| | | | | | |
|---|---|---|---|---|---|
| EP | 1767398 | B1 | * | 11/2008 | ........... B60Q 1/0035 |
| JP | H0981813 | A | * | 9/1995 | ............. G07B 15/00 |
| JP | 2003-30665 | A | | 1/2003 | |
| JP | 2005-284471 | A | | 10/2005 | |
| JP | 2006307517 | A | * | 11/2006 | ............... E04H 8/42 |
| JP | 2010-97410 | A | | 4/2010 | |
| JP | 2013-89129 | A | | 5/2013 | |
| JP | 6175430 | B2 | | 8/2017 | |

* cited by examiner

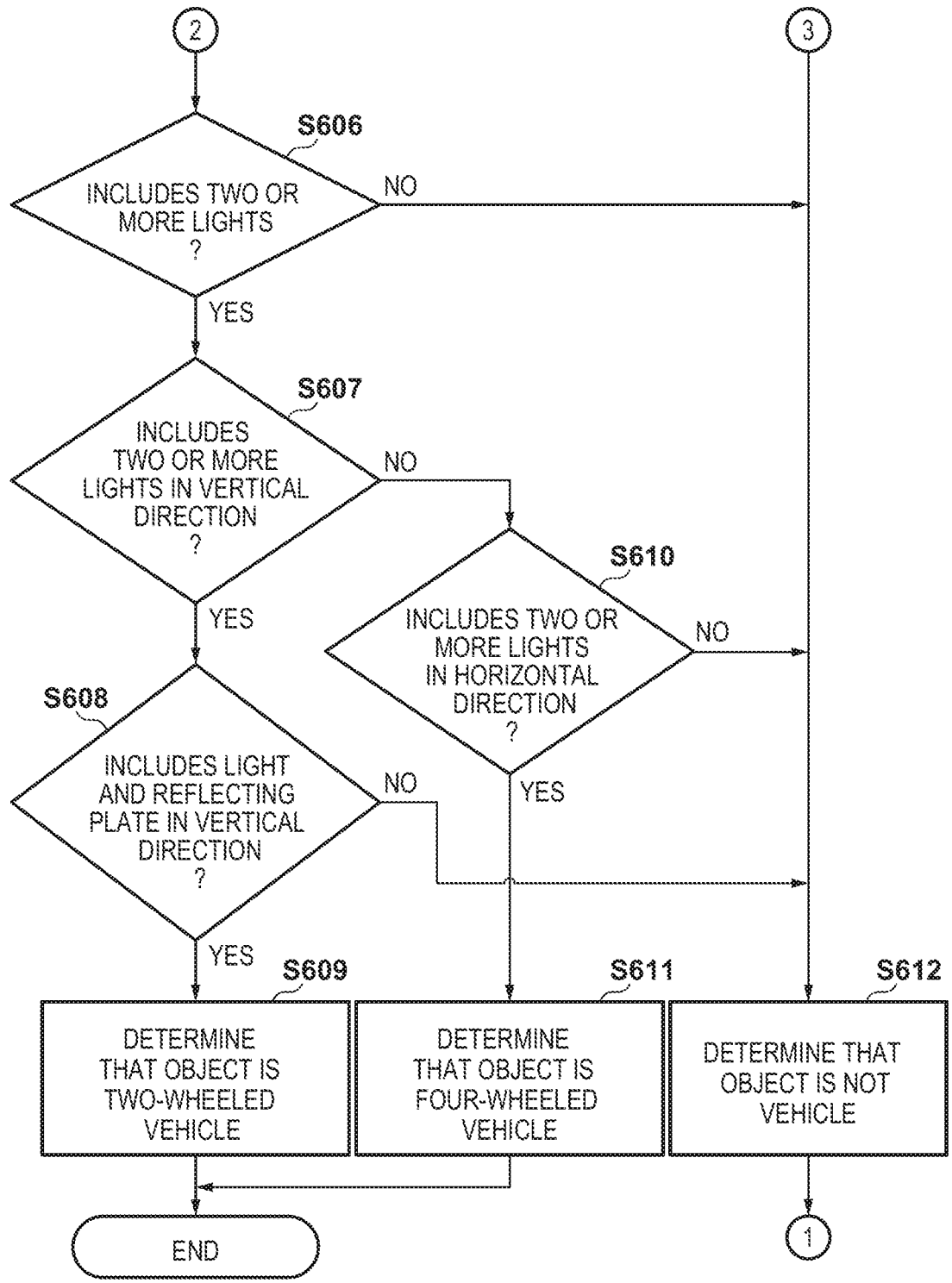

OBJECT RECOGNITION APPARATUS, VEHICLE, AND OBJECT RECOGNITION METHOD

CROSS-REFERENCE TO RELATED APPLICATION(S)

This application is a continuation of International Patent Application No. PCT/JP2018/011840 filed on Mar. 23, 2018, the entire disclosures of which is incorporated herein by reference.

TECHNICAL FIELD

The present disclosure relates to an object recognition apparatus, a vehicle, and an object recognition method.

BACKGROUND ART

A technique for allowing a vehicle such as a two-wheeled vehicle or a four-wheeled vehicle to automatically follow a front vehicle. In this automatic vehicle following technique, it is necessary to recognize that a front object is a vehicle. Japanese Patent No. 6,175,430 describes a method of recognizing an object using an image captured by a camera. In nighttime traveling, a recognition ability for an object by a vehicle lowers as compared with daytime traveling.

SUMMARY OF INVENTION

Technical Problem

An aspect of the present disclosure is provides a technique for accurately recognizing an object in the nighttime. According to some embodiments, there is provided an object recognition apparatus mounted in a vehicle including a sensor, the apparatus comprising: a detection unit configured to detect an object present in a same lane as that of the vehicle by using information from the sensor; an acquisition unit configured to acquire information concerning lights which the object turns on by using the information from the sensor; and a determining unit configured to determine a type of the object based on the information concerning the lights, wherein a condition in which the determination unit determines that the type of the object is a two-wheeled vehicle includes a case in which the object includes not less than two lights arrayed in a vertical direction with respect to the ground surface.

Other features and advantages of the present disclosure will be apparent from the following description taken in conjunction with the accompanying drawings. Note that the same reference numerals denote the same or like components throughout the accompanying drawings.

BRIEF DESCRIPTION OF DRAWINGS

The accompanying drawings, which are incorporated in and constitute a part of the specification, illustrate embodiments of the disclosure and, together with the description, serve to explain principles of the disclosure.

FIG. 6B is a flowchart for explaining an object recognition method according to the embodiment of the present disclosure.

DESCRIPTION OF EMBODIMENTS

Figure 1:
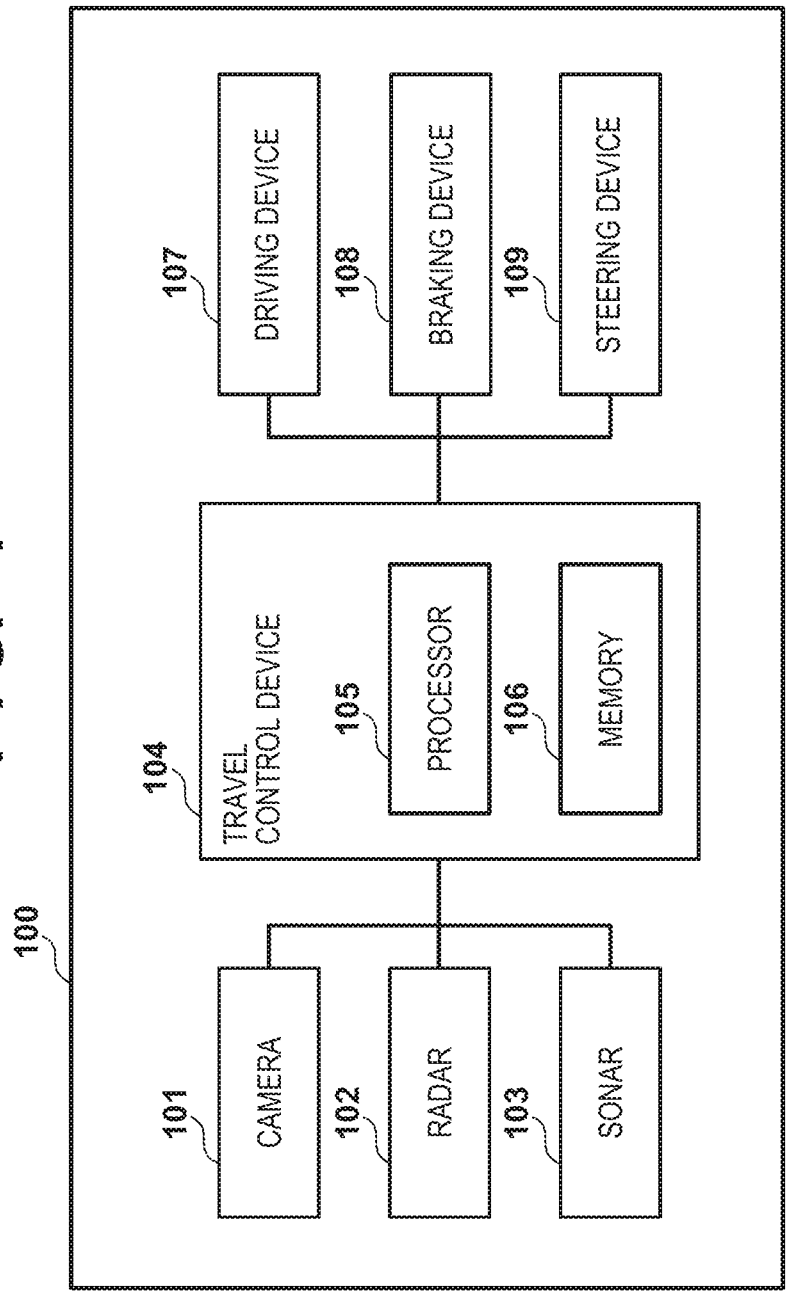
FIG. 1 is a block diagram for explaining an example of the arrangement of a vehicle according to an embodiment of the present disclosure.

An example of the arrangement of a vehicle 100 according to an embodiment of the present disclosure will be described with reference to the block diagram of FIG. 1. The vehicle 100 includes a camera 101, a radar 102, a sonar 103, a travel control device 104, a driving device 107, a braking device 108, and a steering device 109. The vehicle 100 can be a two-wheeled vehicle, a four-wheeled vehicle, or another vehicle.

The camera 101 is a sensor for acquiring information around the vehicle 100 (for example, in front of the vehicle 100) using visible light. The camera 101 may be attached to the front side of the vehicle 100. The travel control device 104 can extract the outline of an object positioned around the vehicle 100 and the division line (for example, a white line) of a lane on a road by analyzing an image captured by the camera 101.

The radar 102 is a sensor for acquiring information around the vehicle 100 (for example, in front of the vehicle 100) using a radio wave. The radar 102 may be attached to the front side of the vehicle 100. The travel control device 104 detects an object positioned around the vehicle 100 and measures a distance to the object by analyzing information acquired by the radar 102.

The sonar 103 is a sensor for acquiring information around the vehicle 100 (for example, in front of the vehicle 100) using a sound wave. The sonar 103 may be attached to the front side of the vehicle 100. The travel control device 104 detects an object positioned around the vehicle 1 and measures a distance to the object by analyzing information acquired by the sonar 103. In the example shown in FIG. 1, the vehicle 100 may include both the radar 102 and the sonar 103. Alternatively, the vehicle 100 may include one of the radar 102 and the sonar 103. In addition, the vehicle 100 may include a LiDAR (Light Detection And Ranging).

The travel control device 104 controls traveling of the vehicle 100. The travel control device 104 is configured by, for example, an ECU (Electronic Control Unit). The travel control device 104 includes a processor 105 and a memory 106. The processor 105 functions as, for example, a CPU (Central Processing Unit) and executes an operation of the travel control device 104. The memory 106 stores, programs executed by the processor 105, data used for processing by the processor, and the like. When instructions included in a program stored in the memory 106 are executed by the processor 105, processing by the travel control device 104 is executed. Alternatively, the travel control device 104 may include a dedicated integrated circuit such as an ASIC (Application Specific Integrated Circuit), and the like to execute processing by the travel control device 104. The travel control device 104 may be arranged by a single ECU or a plurality of ECUs.

The driving device 107 is a device for outputting a driving force to rotate wheels of the vehicle 100 and is configured by, for example, an engine and a transmission. The braking device 108 is a device for decelerating or stopping the vehicle 100 by applying a resistance to the rotation of the wheels. For example, the braking device 108 is configured by a disc brake or drum brake. The steering device 109 is a device for changing the direction of the front wheels and is formed by, for example, a steering device.

When the travel control device 104 performs travel control, the travel control device 104 controls at least one of the driving device 107, the braking device 108, and/or the steering device 109. For example, when the travel control device 104 performs automatic following to the front vehicle, the travel control device 104 controls the driving device 107 to execute acceleration/deceleration of the vehicle 100 and controls the braking device 108 to decelerate or stop the vehicle 100.

Figure 2:
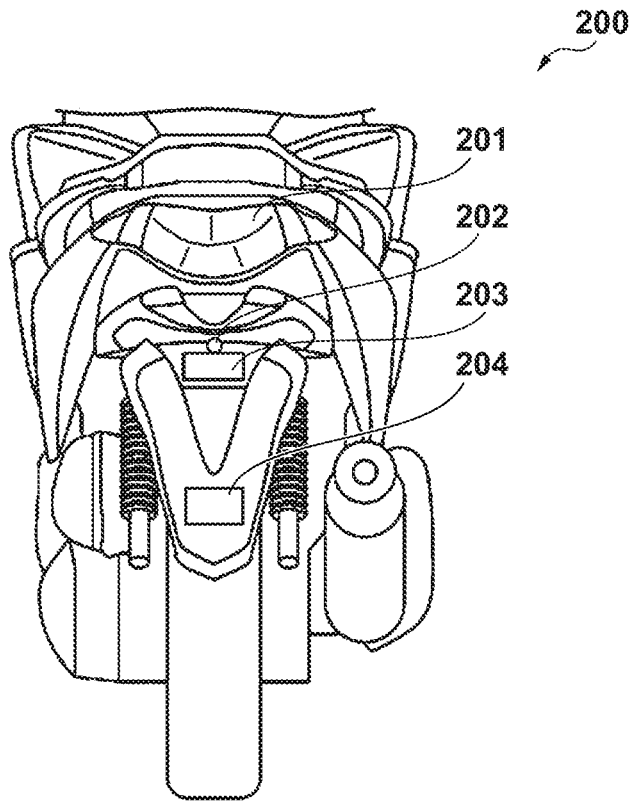
FIG. 2 is a view for explaining an example of the structure of a rear side of a two-wheeled vehicle.

The example of the rear side structure of a two-wheeled vehicle 200 serving as a front vehicle of the vehicle 100 will be described with reference to FIG. 2. The two-wheeled vehicle 200 includes a taillight 201, a license light 202, a number plate 203, and a reflecting plate 204. The taillight 201 is a light source for emitting light toward behind the two-wheeled vehicle 200. The license light 202 is a light source for emitting light toward the number plate 203. The number plate 203 is a plate member on which the registration number of the two-wheeled vehicle 200 is printed. The reflecting plate 204 is a plate member for reflecting the received light. The taillight 201, the license light 202, and the reflecting plate 204 are arrayed in the vertical direction with respect to the ground surface.

Figure 3:
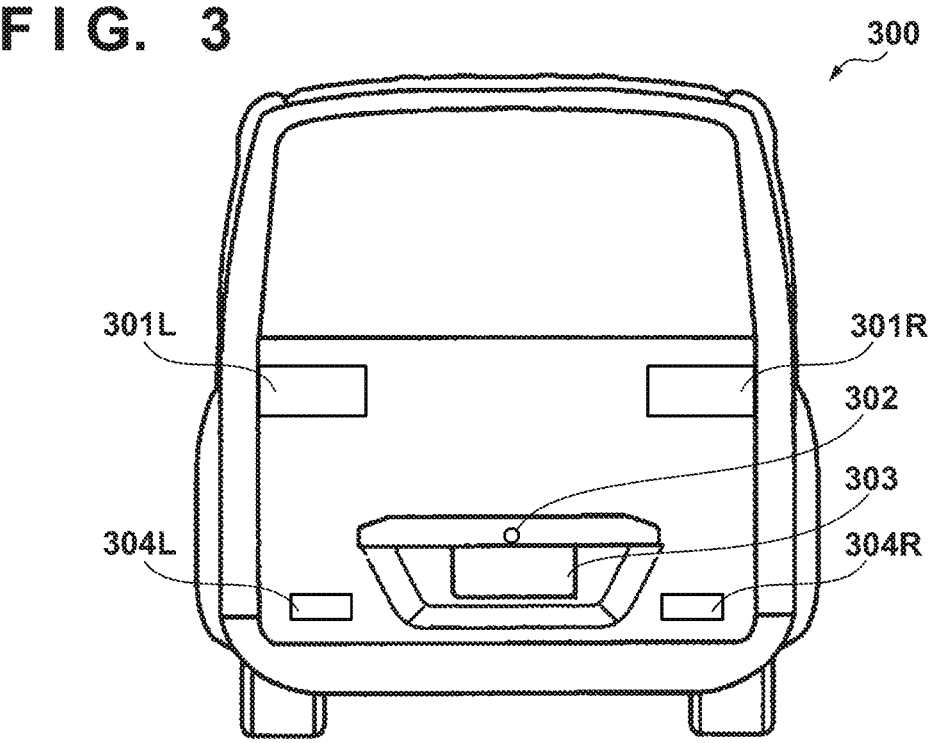
FIG. 3 is a view for explaining an example of the structure of the rear side of a four-wheeled vehicle.

The rear side structure of a four-wheeled vehicle 300 serving as a front vehicle of the vehicle 100 will be described with reference to FIG. 3. The four-wheeled vehicle 300 includes a pair of left and right taillight 301L and 301R, a license light 302, a number plate 303, and a pair of left and right reflecting plate 304L and 304R. The taillights 301L and 301R are light sources for emitting light toward behind the four-wheeled vehicle 300. The license light 302 is a light source for emitting light toward the number plate 303. The number plate 303 is a plate member on which the registration number of the four-wheeled vehicle 300 is printed. The pair of left and right reflecting plates 304L and 304R are plate members which reflect the received light. The taillight 301L and 301R are arrayed in the horizontal direction with respect to the ground surface. The reflecting plates 304L and 304R are arrayed in the horizontal direction with respect to the ground surface.

An example of an image captured by the camera 101 during nighttime when the front vehicle of the vehicle 100 is the two-wheeled vehicle 200 will be described with reference to FIG. 4. A division line 401L is a division line such as a white line present on the left side of the vehicle 100. A division line 401R is a division line such as a white line present on the right side of the vehicle 100. An object 402 corresponds to the two-wheeled vehicle 200. Since the image is the image captured during nighttime, the outline of the object 402 is unclear. Light 403 is light emitted by the taillight 201. Light 404 is light emitted by the license light 202. The light 403 and the light 404 are arrayed in the vertical direction with respect to the ground surface.

An example of an image captured by the camera 101 during nighttime when the front vehicle of the vehicle 100 is the four-wheeled vehicle 300 will be described with reference to FIG. 5. A division line SOIL is a division line such as a white line present on the left side of the vehicle 100. A division line 501R is a division line such as a white line present on the right side of the vehicle 100. An object 502 corresponds to the four-wheeled vehicle 300. Since the image is the image captured during nighttime, the outline of the object 502 is unclear. Light 503 is light emitted by the taillight 301L. Light 504 is light emitted by the taillight 301R. Light 505 is a light emitted by the license light 302. The light 503 and the light 504 are arrayed in the horizontal direction with respect to the ground surface.

Figure 4:
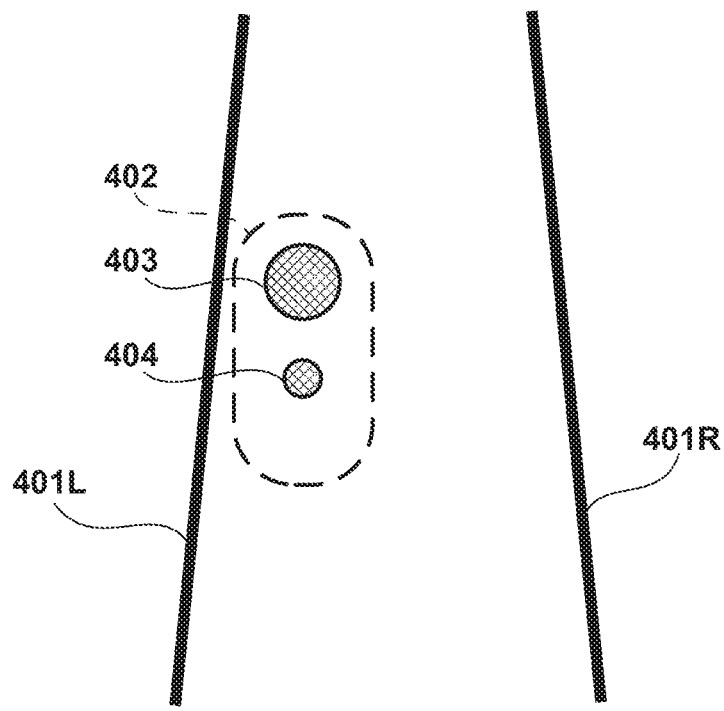
FIG. 4 is a view for explaining an example of an image acquired by a camera according to the embodiment of the present disclosure.
Figure 5:
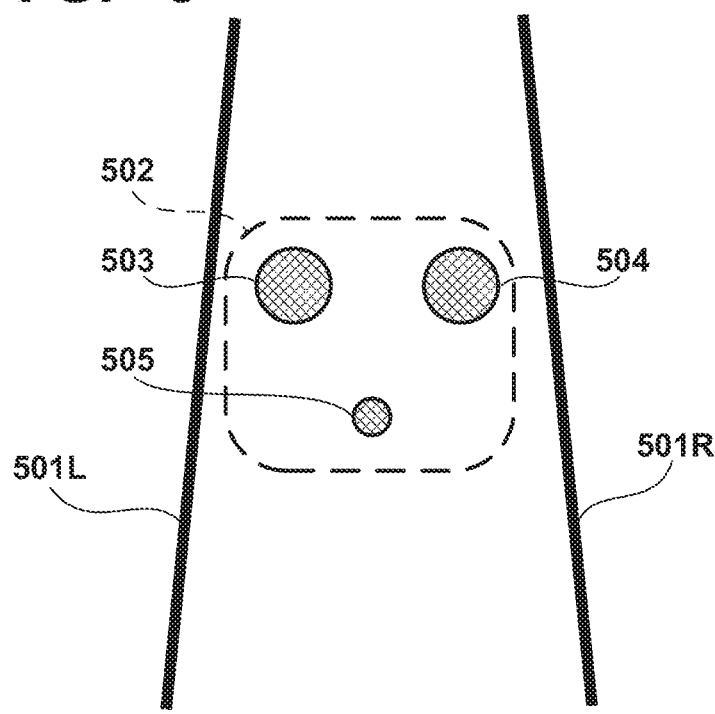
FIG. 5 is a view for explaining an example of an image acquired by a camera according to the embodiment of the present disclosure.

As can be read from FIGS. 4 and 5, the positions of the lights for emitting light beams included in the images and the numbers of lights are different between the cases in which the front vehicle of the vehicle 100 are two-wheeled vehicle and the four-wheeled vehicle. For this reason, the travel control device 104 of the vehicle 100 can determine the type of the front object based on such information concerning the ON lights.

Figure 6A:
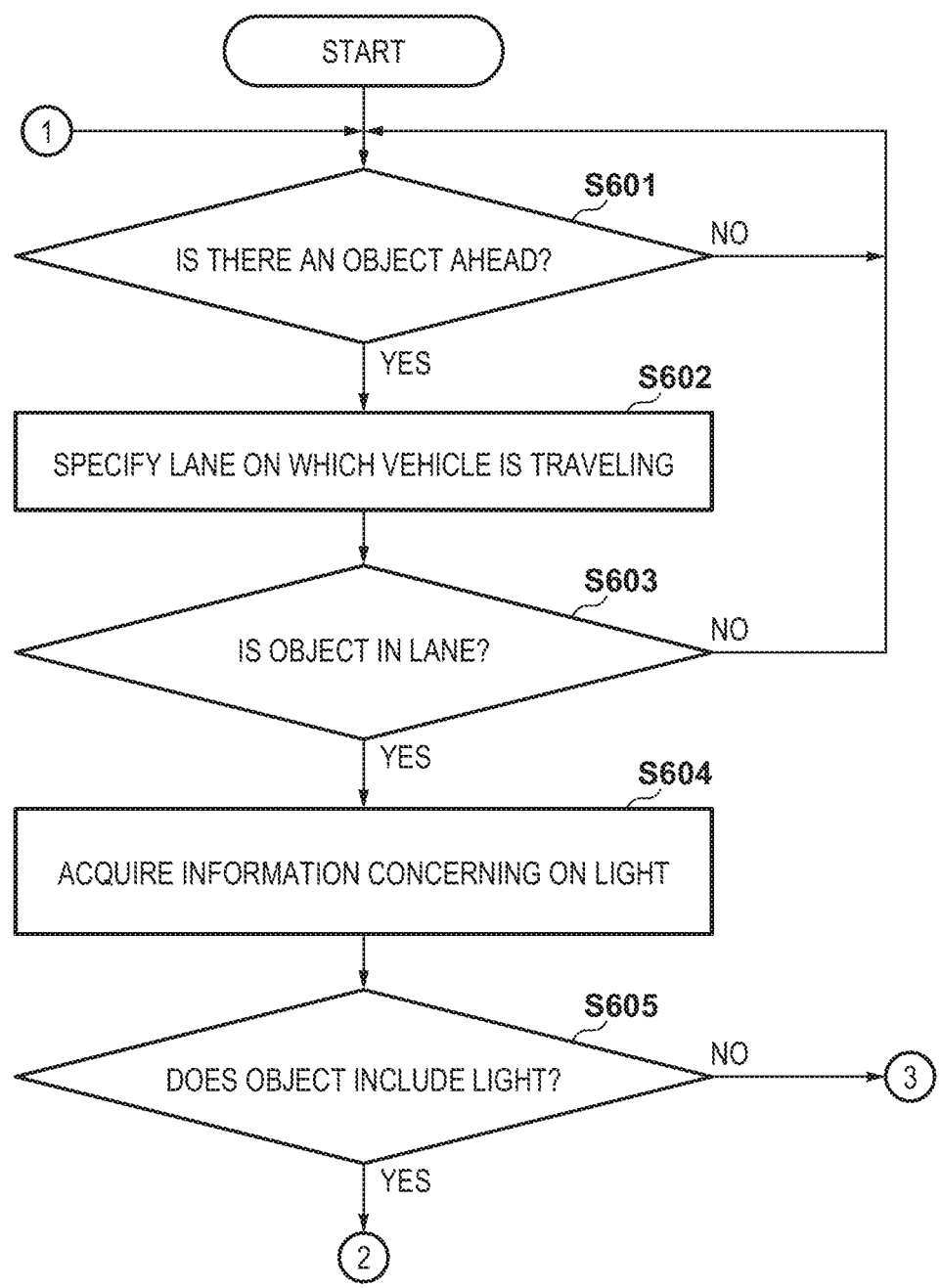
FIG. 6A is a flowchart for explaining an object recognition method according to the embodiment of the present disclosure.

A method of the travel control device 104 mounted in the vehicle 100 to recognizing an object will be described with reference to flowcharts in FIGS. 6A and 6B. Since the travel control device 104 recognizes an object in the following processing, the travel control device 104 may be referred to as an object recognition apparatus. The object recognition method can be started when automatic following of the front vehicle is instructed by the driver in the vehicle 100. In the following processing, to specify a vehicle which follows the front vehicle, the travel control device 104 determines the type of the detected object. The following steps may be performed by causing the processor 105 to execute instructions included in the programs stored in the memory 106.

In step S601, the travel control device 104 determines using information from the radar 102 or the sonar 103 whether an object exists ahead of the vehicle 100. If this condition is satisfied (YES in step S601), the travel control device 104 advances the process to step S602. If this condition is not satisfied (NO in step S602), the travel control device 104 repeats step S601 to wait for object detection.

In step S602, by using information from the camera 101, the travel control device 104 specifies the lane on which the vehicle 100 is traveling. The travel control device 104 specifies the lane by specifying, for example, the left division line SOIL and the right division line 501R of the vehicle 100.

In step S603, the travel control device 104 determines whether the detected object exists in the specified lane. If this condition is satisfied (YES in step S603), the travel control device 104 advances the process to step S604. If this condition is not satisfied (NO in step S603), the travel control device 104 returns the process to step S601 to search for another object serving as a following target. In steps S601 to S603, an object present in the same lane as that of the vehicle 100 is detected using information from the camera 101 and the radar 102 or the sonar 103.

In step S604, the travel control device 104 acquires information concerning the ON light of the detected object by using the information from the camera 101. The information concerning this light includes the positions and the number of ON lights of the detected objects. As described with reference to FIGS. 4 and 5, the travel control device 104 acquires information concerning the light based on light included in the image.

In steps S605 to S612, the travel control device 104 determines the type of the detected object based on the information concerning the light. In step S605, the travel control device 104 determines whether the detected object includes an ON light. If this condition is satisfied (YES in step S605), the travel control device 104 advances the process to step S606. If this condition is not satisfied (NO in step S605), the travel control device 104 advances the process to step S612. In step S612, the travel control device 104 determines that the type of the detected object is not a vehicle. The travel control device 104 returns the process to step S601 to search for another object serving as a following target.

In step S606, the travel control device 104 determines whether the detected object includes two or more ON lights. If this condition is satisfied (YES in step S606), the travel control device 104 advances the process to step S607. If this condition is not satisfied (NO in step S606), the travel control device 104 advances to the process to step S612. As described above, if the type of the object is a vehicle (the four-wheel vehicle or the two-wheeled vehicle), the detected object includes two or more ON lights. For this reason, if the number of ON lights is one or less, the type of this object can be determined not as the vehicle.

In step S607, the travel control device 104 determines whether the detected object includes two or more ON lights arrayed in the vertical direction with respect to the ground surface. If this condition is satisfied (YES in step S607), the travel control device 104 advances the process to step S608. If this condition is not satisfied (NO in step S607), the travel control device 104 advances the process to step S610.

In step S608, the travel control device 104 determines the detected object includes a light and a reflecting plate arrayed in the vertical direction with respect to the ground surface. If this condition is satisfied (YES in step S608), the travel control device 104 advances the process to step S609. If this condition is not satisfied (NO in step S608), the travel control device 104 advances the process to step S612. The position of the reflecting plate can be specified by causing the vehicle 100 to emit light to the object by the headlight or the like and capturing its reflected light by the camera 101.

In step S609, the travel control device 104 determines that the type of the detected object is a two-wheeled vehicle. After that, the travel control device 104 may end the processing for recognizing an object and execute automatic following using the two-wheeled vehicle as the front vehicle.

In step S610, the travel control device 104 determines using information from the camera 101 whether the detected object includes two or more ON lights arrayed in the horizontal direction with respect to the ground surface. If this condition is satisfied (YES in step S610), the travel control device 104 advances the process to step S611. If this condition is not satisfied (NO in step S610), the travel control device 104 advances the process to step S612.

In step S611, the travel control device 104 determines that the type of the detected object is a four-wheeled vehicle. After that, the travel control device 104 may end the object recognition processing and execute the automatic following using the four-wheeled vehicle as the front vehicle.

As described above, a condition in which the travel control device 104 determines that the type of the object is a vehicle is a case in which an object includes two or more lights (YES in step S606). A condition in which the travel control device 104 determines that the type of the object is a two-wheeled vehicle is a case in which the object includes two or more lights arrayed in the vertical direction with respect to the ground surface (YES in step S607) and a case in which the object includes the light and reflecting plate arrayed in the vertical direction with respect to the ground surface (YES in step S608). In addition, a condition in which the travel control device 104 determines that the type of the object is a four-wheeled vehicle includes a case in which the object includes two or more lights arrayed in the horizontal direction with respect to the ground surface (YES in step S610). As described above, according to this embodiment, since the type of the object is determined based on the information concerning the ON light, the type of the object can be determined accurately based on the image captured during nighttime.

SUMMARY OF EMBODIMENT

<Arrangement 1>
An object recognition apparatus (104) mounted in a vehicle (100) including a sensor (101-103), the apparatus comprising:
a detection unit (S601-S603) configured to detect an object present in a same lane as that of the vehicle by using information from the sensor;
an acquisition unit (S604) configured to acquire information concerning lights which the object turns on by using the information from the sensor; and
a determining unit (S606-S612) configured to determine a type of the object based on the information concerning the lights.

With this arrangement, since it is unnecessary to determine an outline of the object in the image, the type of the object can be accurately and quickly determined even during nighttime. As a result, the following to the front vehicle can be facilitated.

<Arrangement 2>
The object recognition apparatus according to arrangement 1, wherein the information concerning the lights includes positions of ON lights and the number of ON lights in the object.

With this arrangement, the type of the object can be determined using the positions of the lights and the number of lights.

<Arrangement 3>
The object recognition apparatus according to arrangement 1 or 2, wherein a condition in which the determination unit determines that the type of the object is a vehicle includes a case (S606) in which the object includes not less than two lights.

With this arrangement, it is possible to specify using the information concerning the lights that the object is the vehicle.

<Arrangement 4>
The object recognition apparatus according to any one of arrangements 1 to 3, wherein a condition in which the determination unit determines that the type of the object is a four-wheeled vehicle includes a case (S610) in which the object includes not less than two lights arrayed in a horizontal direction with respect to a ground surface.

With this arrangement, it is possible to specify using the information concerning the lights that the front vehicle is the four-wheeled vehicle.

<Arrangement 5>
The object recognition apparatus according to any one of arrangements 1 to 4, wherein a condition in which the determination unit determines that the type of the object is a two-wheeled vehicle includes a case (S607) in which the object includes not less than two lights arrayed in a vertical direction with respect to the ground surface.

With this arrangement, it is possible to specify using the information concerning the lights that the front vehicle is the two-wheeled vehicle.

<Arrangement 6>

The object recognition apparatus according to any one of arrangements 1 to 5, wherein a condition in which the determination unit determines that the type of the object is the two-wheeled vehicle includes a case (S608) in which the object includes a light and a reflecting plate arrayed in the vertical direction with respect to the ground surface.

With this arrangement, it is more accurately specify using the information concerning the lights that the front vehicle is the two-wheeled vehicle.

<Arrangement 7>

The object recognition apparatus according to any one of arrangements 1 to 6, wherein the sensor includes a radar (102) or a sonar (103), and a camera (101).

With this arrangement, a more remote object can be detected by the radar or the sonar, and the information concerning the lights can be acquired by the camera.

<Arrangement 8>

A vehicle (100), comprising
an object recognition apparatus (104) according to any one of arrangements 1 to 7, and
a sensor.

With this arrangement, since it is unnecessary to determine the outline of the object in the image, the type of the object can be accurately and quickly determined even during nighttime. As a result, the following to the front vehicle can be facilitated.

<Arrangement 9>

The vehicle according to arrangement 8, wherein the sensor is arranged on a front side of the vehicle.

With this arrangement, the information of the front side of the vehicle can be acquired.

<Arrangement 10>

A method of recognizing an object in a vehicle (100) including a sensor (101-103), the method comprising:
detecting (S601-S603) an object present in a same lane as that of the vehicle by using information from the sensor;
acquiring (S604) information concerning lights which the object turns on by using the information from the sensor; and
determining (S606-S612) a type of the object based on the information concerning the lights.

With this arrangement, since it is unnecessary to determine an outline of the object in the image, the type of the object can be accurately and quickly determined even during nighttime. As a result, the following to the front vehicle can be facilitated.

The invention is not limited to the foregoing embodiments, and various variations/changes are possible within the spirit of the invention. Therefore, to apprise the public of the scope of the present invention, the following claims are made.

The invention claimed is:

1. An object recognition apparatus mounted in a vehicle including a sensor, the apparatus comprising at least one processor circuit and a memory comprising instructions, that when executed by the processor circuit, cause the processor circuit to at least:
detect that the vehicle is traveling on a same lane as that of a front vehicle of the vehicle by detecting left and right division lines using information from the sensor;
acquire information concerning lights which the front vehicle turns on by detecting a taillight of the front vehicle using the information from the sensor captured during nighttime;
determine a type of the front vehicle during nighttime based on the information concerning the lights acquired during nighttime; and
control traveling of the vehicle based on the determined type of the front vehicle,
wherein a condition in which it is determined that the type of the front vehicle is a two-wheeled vehicle includes a case in which the front vehicle includes a reflecting plate and not less than two lights arrayed in a vertical direction with respect to the ground surface.

2. The object recognition apparatus according to claim 1, wherein the information concerning the lights includes positions of ON lights and the number of ON lights in the front vehicle.

3. The object recognition apparatus according to claim 1, wherein a condition in which it is determined that the type of the front vehicle is a vehicle includes a case in which the front vehicle includes not less than two lights.

4. The object recognition apparatus according to claim 1, wherein a condition in which it is determined that the type of the front vehicle is a four-wheeled vehicle includes a case in which the front vehicle includes not less than two lights arrayed in a horizontal direction with respect to a ground surface.

5. The object recognition apparatus according to claim 1, wherein the sensor includes a radar or a sonar, and a camera.

6. A vehicle, comprising
an object recognition apparatus according to claim 1, and
a sensor.

7. The vehicle according to claim 6, wherein the sensor is arranged on a front side of the vehicle.

8. A method of recognizing an object in a vehicle including a sensor, the method comprising:
detecting that the vehicle is traveling on a same lane as that of a front vehicle of the vehicle by detecting left and right division lines using information from the sensor;
acquiring information concerning lights which the front vehicle turns on by detecting a taillight of the front vehicle using the information from the sensor captured during nighttime;
determining a type of the front vehicle during nighttime based on the information concerning the lights acquired during nighttime; and
control traveling of the vehicle based on the determined type of the front vehicle,
wherein a condition in which it is determined that the type of the front vehicle is a two-wheeled vehicle includes a case in which the front vehicle includes a reflecting plate and not less than two lights arrayed in a vertical direction with respect to the ground surface.

9. The object recognition apparatus according to claim 1, wherein the condition in which it is determined that the type of the front vehicle is a two-wheeled vehicle includes a case in which the front vehicle includes a reflecting plate and not less than two ON lights arrayed in a vertical direction with respect to the ground surface.

* * * * *